United States Patent [19]

Dormer et al.

[11] Patent Number: 5,578,875
[45] Date of Patent: Nov. 26, 1996

[54] DUAL BATTERY RECHARGER WITH BACKUP POWER FEATURE FOR USE IN SYSTEMS HAVING A BASE UNIT AND BATTERY-POWERED PORTABLE UNIT

[75] Inventors: Michael W. Dormer, Basingstoke; Michael B. Ashdown, High Wycombe, both of Great Britain

[73] Assignee: Vtech Communications, Ltd., Hong Kong

[21] Appl. No.: 252,410

[22] Filed: Jun. 1, 1994

[30] Foreign Application Priority Data

Jun. 2, 1993 [GB] United Kingdom .................. 9311313

[51] Int. Cl.⁶ ..................................................... H02J 7/00
[52] U.S. Cl. .............................. 307/66; 307/150; 455/89; 455/127
[58] Field of Search ................................ 307/64, 66, 150, 307/151, 43; 320/2, 14; 379/61, 58; 455/38.3, 127, 343, 89

[56] References Cited

U.S. PATENT DOCUMENTS

| | | | |
|---|---|---|---|
| 4,297,629 | 10/1981 | Godard et al. | 320/7 |
| 4,631,468 | 12/1986 | Satoh | 320/14 |
| 4,647,787 | 3/1987 | Pommer, II | 379/413 |
| 4,672,293 | 6/1987 | Crampton | 320/14 |
| 4,760,322 | 7/1988 | Crampton | 320/14 |
| 5,036,532 | 7/1991 | Metroka et al. | 455/127 |
| 5,057,762 | 10/1991 | Goedken et al. | 320/2 |
| 5,150,032 | 9/1992 | Ho | 320/14 |
| 5,191,277 | 3/1993 | Ishikura et al. | 320/2 |
| 5,243,269 | 9/1993 | Katayama et al. | 320/14 |
| 5,270,946 | 12/1993 | Shibasaki et al. | 364/492 |
| 5,287,013 | 2/1994 | Adair | 307/328 |
| 5,287,053 | 2/1994 | Hutchinson | 320/2 |

FOREIGN PATENT DOCUMENTS

| | | |
|---|---|---|
| 0179587 | 4/1986 | European Pat. Off. . |
| 2242794 | 10/1991 | United Kingdom . |
| 2259615 | 3/1993 | United Kingdom . |

*Primary Examiner*—Jonathan Wysocki
*Assistant Examiner*—Jonathan S. Kaplan
*Attorney, Agent, or Firm*—Dick and Harris

[57] ABSTRACT

An alternative power supply apparatus for use in association with systems having a base unit connected to an external power supply and an associated battery-powered portable unit. The alternative power supply apparatus includes two rechargeable batteries one of which serves to provide electrical power to the portable unit. There are two ports associated with the base unit, each port operably and detachably accepts one of the two rechargeable batteries. The apparatus further includes a voltage regulator which provides regulated voltage to circuitry in the base unit. Two current sources each associated with a respective one of the two ports provides an electrical current to the batteries when they are operably accepted by the ports. The second rechargeable battery, which is interchangeable with the first rechargeable battery, provides a source voltage to the voltage regulator upon failure of the external power supply.

20 Claims, 2 Drawing Sheets

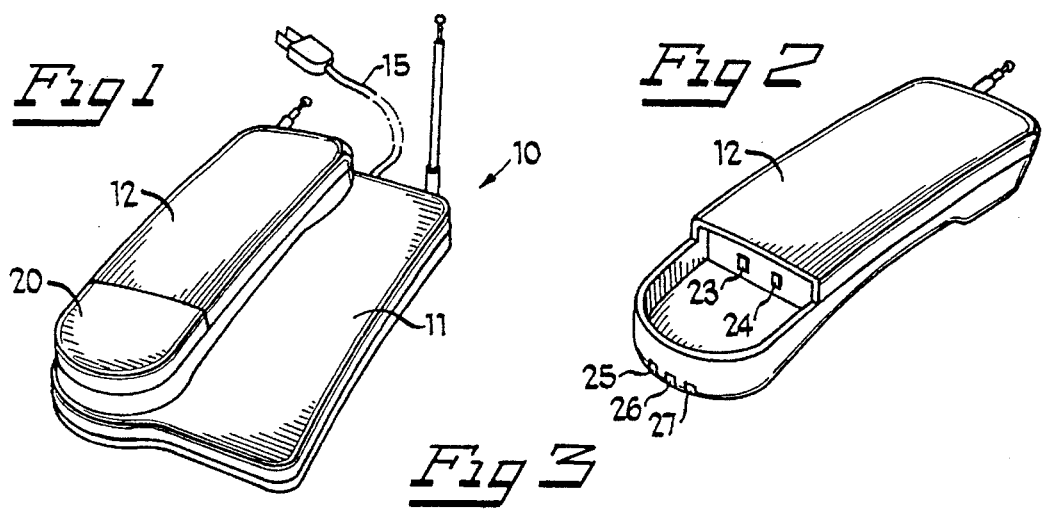
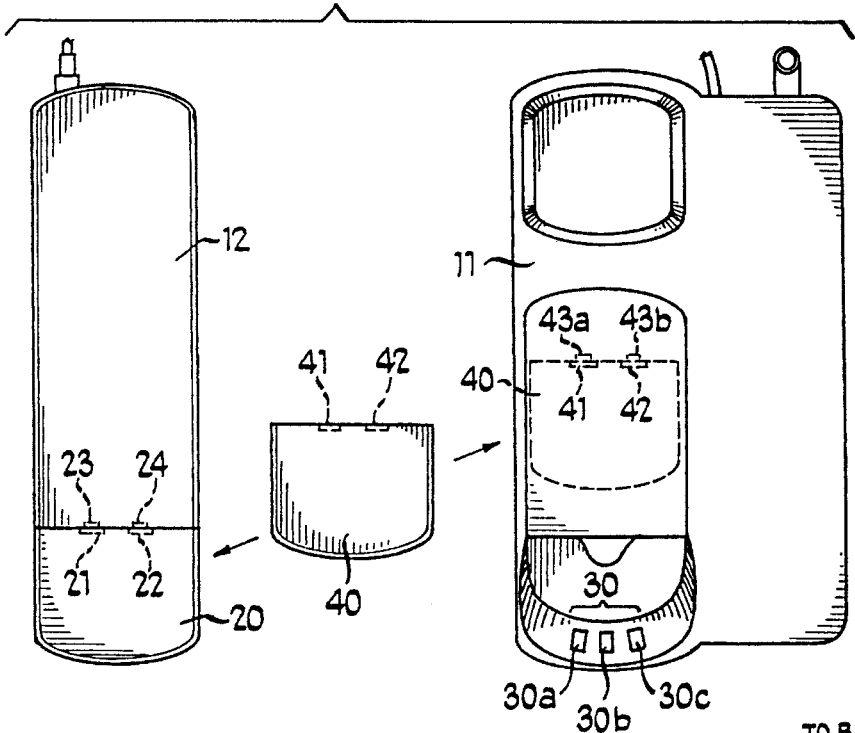
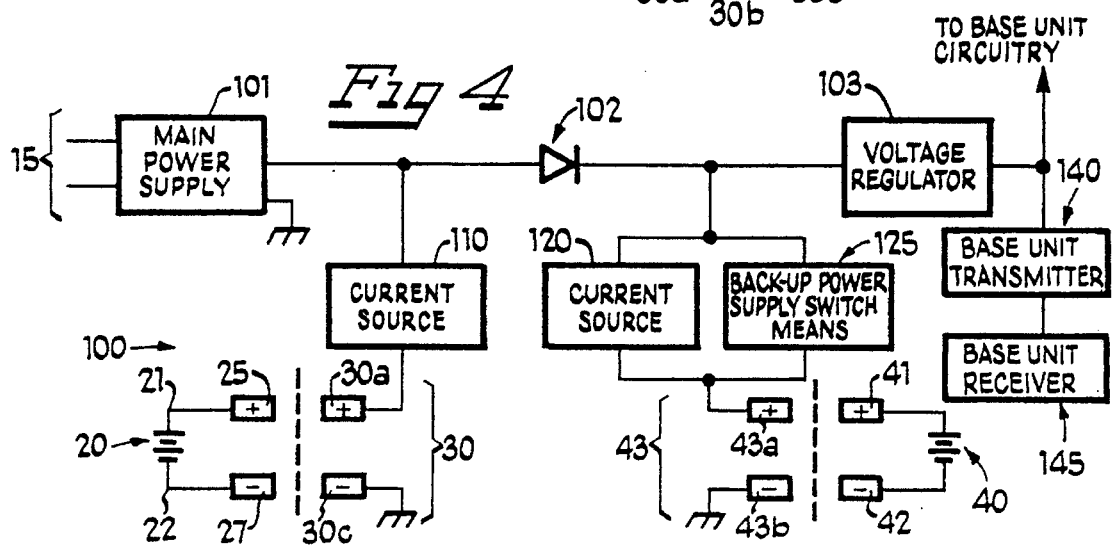

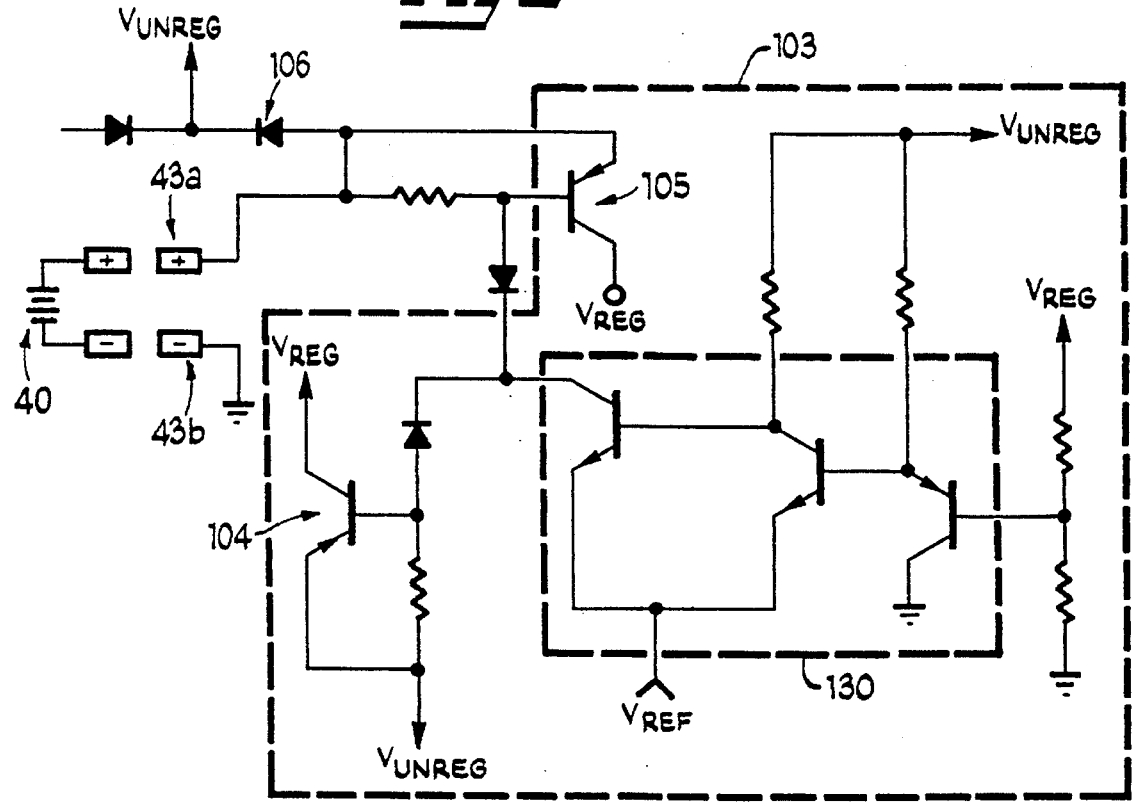
*Fig 5*
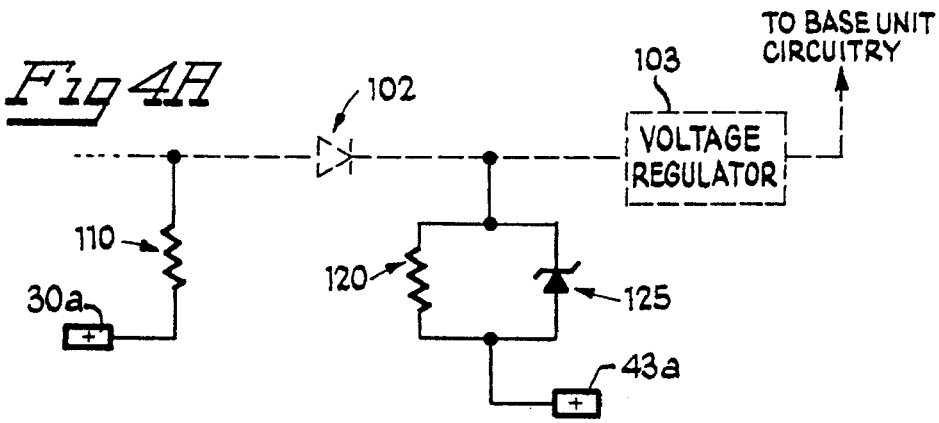
*Fig 4A*
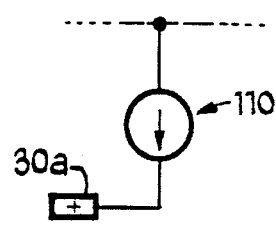
*Fig 4B*    *Fig 4C*

DUAL BATTERY RECHARGER WITH BACKUP POWER FEATURE FOR USE IN SYSTEMS HAVING A BASE UNIT AND BATTERY-POWERED PORTABLE UNIT

BACKGROUND OF THE INVENTION

1. Field of Invention

The present invention relates generally to a power supply for systems having an externally powered base unit and an associated rechargeable battery-powered portable unit. In particular, the present invention relates to an apparatus capable of charging two interchangeable rechargeable batteries simultaneously and further capable of utilizing one of those rechargeable batteries to power the base unit in the event of failure of the external power supply. While the present invention has utility in any system having an externally powered base unit and an associated rechargeable battery-powered portable unit, the invention has been disclosed in a cordless telephone embodiment. During the last decade the cordless telephone has dramatically invaded modern life such that the present invention has great utility when incorporated therein.

2. Background Art

Cordless telephones usually consist of one base unit and one handset. The base unit sends voice and data signals to its associated handset and receives voice and data signals from the handset over a radio frequency link. The data signals are utilized by the base unit to manipulate the subscriber telephone line, which is connected to the base unit. For instance, the base unit detects a ring signal on the telephone line and may further place the telephone line in an off-hook state if so directed by the user. The base unit further processes voice signals and transmits and receives both voice and data signals. Therefore the cordless telephone base unit, unlike a conventional line telephone, utilizes a great deal of power for which it must be connected to an external power source. Due to this external power connection, the cordless telephone will become inoperative during a power outage unlike its "corded" cousin, which may continue to receive power from the telephone company through the subscriber telephone line. Thus, in a household where the cordless telephone is the only telephone, the users would be without telephone service during a power outage.

The handset also manipulates voice and data and receives and transmits signals. Given its portability, the handset is usually powered by a rechargeable battery. These rechargeable batteries typically have a small voltage operating range in the cordless telephone handset and thus must be recharged often. Such recharging has typically been accomplished in prior devices by returning the handset with the rechargeable battery therein to the base unit cradle. Exposed charging terminals with the cradle mate with exposed contacts on the handset for charging the battery. However, as is often the case, the cordless telephone owner may forget to return the handset to the base unit for recharging and thus the telephone will ultimately become inoperable.

Accordingly, it is an object of the present invention to provide two interchangeable rechargeable batteries, such that when a user forgets to recharge the battery associated with the portable unit a second battery can be utilized to power the portable unit.

It is a further object of the present invention to provide an uninterruptable power supply for the base unit by utilizing the second rechargeable battery when it is charged and operably associated with the base unit to power the base unit circuitry in the event of a power failure.

These and other objects of the present invention will become apparent in light of the present specification, claims and drawings.

SUMMARY OF THE INVENTION

A preferred embodiment of the invention comprises an alternative power supply apparatus for use in association with systems having a base unit connected to an external power supply and an associated battery-powered portable unit. The alternative power supply apparatus is capable of charging two rechargeable batteries simultaneously and once the second of the two batteries is charged is alternatively capable of providing an uninterruptable power supply to the base unit circuitry in the event the external power should fail.

The apparatus includes first and second port means both of which are operably associated with the base unit for operably and detachably accepting a respective one of the two rechargeable batteries so as to allow electrical current supplied by the external power source to flow between the first and second port means and the respective ones of the two rechargeable batteries. The first of the two rechargeable batteries is operably associated with the battery-powered portable unit serving to provide electrical power to the portable unit. The second battery is operably and detachably accepted by the second port means and is fully interchangeable with the first battery. The rechargeable batteries in a preferred embodiment are nickel cadmium type batteries, however, other rechargeable batteries are equally suited for use in this apparatus.

The apparatus also includes two current source means— each of which may comprise a simple resistor network, a constant current source or a transistor network. The first current source means is operably associated with the external power supply and the first port means for providing an electrical current to the first rechargeable battery upon the operable acceptance of the first battery by the first port means. The second current source means is operably associated with the external power supply and the second port means for providing an electrical current to the second rechargeable battery upon the operable acceptance of the second battery by the second port means.

The apparatus further includes a backup power supply switch means, which is operably connected between the second port means and the voltage regulation means. The voltage regulation means regulates the voltage to circuitry in the base unit and, in a preferred embodiment, further serves to step down the voltage. The backup power supply switch means provides direct current voltage from the second rechargeable battery upon failure of the external power supply to provide voltage to the voltage regulation means.

In one preferred embodiment, the backup power supply switch means comprises a zener diode. The use of a zener diode rather than a simple diode further provides for quick recharge means. This quick recharge means provides a large electrical current to the second port means upon the operable acceptance of the second rechargeable battery by the second port means, when this second battery is substantially discharged. This large electrical current serves to quickly recharge the second battery until its voltage reaches a predetermined voltage. In an embodiment where quick recharging is not desired, the backup power supply switch means would comprise a simple diode rather than a zener diode.

In another preferred embodiment, the backup power supply switch means comprises a pass device, such as a bipolar transistor, which in turn comprises a portion of the voltage regulator, thus minimizing the voltage drop between the rechargeable battery connected to the second port means and the voltage regulator.

In a preferred embodiment, the alternative power supply apparatus further includes a reverse current prevention means, which comprises a diode. The reverse current prevention means is operably connected between the first current source means and the backup power supply switch means for substantially preventing current generated by the second rechargeable battery operably accepted by the second port means from charging the first rechargeable battery operably accepted by the first port means. Such reverse current prevention means is unnecessary, of course, where the first rechargeable battery is not operably accepted by the first port means.

Where the external power supply is an alternating current power supply and the base unit circuitry utilizes a direct current voltage, the apparatus further includes a DC power supply means connected to the external power supply for converting an alternating current voltage to a direct current voltage.

BRIEF DESCRIPTION OF THE DRAWINGS

FIG. 1 of the drawings is a perspective view showing, in particular, a cordless telephone in which the alternative power supply apparatus may be utilized;

FIG. 2 of the drawings is a perspective view of the battery-powered portable handset of the cordless telephone of FIG. 1 shown, in particular, with its rechargeable battery removed;

FIG. 3 of the drawings is a top view of the cordless telephone of FIG. 1 wherein the battery-powered portable handset is removed from the base unit, the second rechargeable battery is also shown removed from the base unit, as well as, being alternatively positioned in the base unit;

FIG. 4 of the drawings is a block schematic diagram of the alternative power supply apparatus;

FIGS. 4A, B and C of the drawings are partial schematic diagrams of potential embodiments of first and second current source and back-up power supply switch means; and FIG. 5 of the drawings is a schematic diagram of one potential embodiment for the voltage regulator, which has been combined with the backup power supply switch means.

DETAILED DESCRIPTION OF THE DRAWINGS

While this invention is susceptible of embodiment in many different forms and in many different systems, there is shown in the drawings and will herein be described in detail, one specific embodiment in one representative system with the understanding that the present disclosure is to be considered as an exemplification of the principles of the invention and is not intended to limit the invention to the embodiment or the system illustrated.

FIGS. 1, 2 and 3 of the drawings show a cordless telephone system in which the present invention may be utilized. While the present invention is depicted within a cordless telephone, the inventors contemplate the use of the present invention in any system wherein a base unit connected to an external power supply has an associated battery-powered portable unit. For example, such systems may include a garage door opener, a combination rechargeable flashlight and wall-mounted emergency lighting system, walkie-talkie system or a combined video cassette player/portable video camera system.

Referring to FIGS. 1, 2 and 3, there is shown a cordless telephone 10 having a base unit 11 and a battery-powered portable handset 12. Base unit 11 includes electrical cord 15, which operably connects base unit 11 to an AC adapter in turn connected to a wall socket wall socket (not shown) for providing a DC voltage to base unit 11. Battery-powered portable handset 12 is operably associated with first rechargeable battery 20. First rechargeable battery 20 serves to provide electrical power to battery-powered portable handset 12.

As shown in FIG. 3, first rechargeable battery 20 has two terminals 21 and 22, which are in operable contact with electrical contacts 23 and 24, respectively. Electrical contacts 23 and 24 (also shown in FIG. 2) are each operably connected to respective one of two of the three electrical contacts 25, 26 and 27. The third of electrical contacts 25, 26 and 27 being utilized to receive a security code from base unit 11, when electrical contacts 25, 26 and 27 are operably and detachably accepted by first port means 30. Although terminals 21 and 22 and electrical contacts 23 and 24 are shown as contacts, the inventors contemplate the use of a plug and socket assembly rather than electrical contacts.

First port means 30 is operably associated with base unit 11 and operably and detachably accepts first rechargeable battery 20 through electrical contacts 25 and 27; 23 and 24 and terminals 21 and 22 so as to allow electrical current to flow between first port means 30 and first rechargeable battery 20, such that first rechargeable battery 20 is electrically charging. Although first port means 30 is shown in FIG. 3 as comprising three electrical contacts 30a, 30b and 30c located within the base unit cradle, the inventors contemplate other constructions for first port means 30 including the use of a plug and socket assembly instead of electrical contacts. The inventors also contemplate that first port means 30 may be located outside the cradle, possibly even distally from base unit 11, but operably associated with base unit 11 via electrical connection. Furthermore, first port means 30 could have as few as two electrical contacts and may have more than three.

As shown in FIG. 3, second rechargeable battery 40 has two terminals 41 and 42. Second rechargeable battery 40 is fully interchangeable with first rechargeable battery 20 and may thus be placed into operable contact with electrical contacts 23 and 24 in battery-powered portable handset 12 in place of first rechargeable battery 20. Second rechargeable battery 40 may alternatively be operably and detachably accepted by second port means 43 for recharging.

Second port means 43 is operably associated with base unit 11 and operably and detachably accepts second rechargeable battery 40 so as to allow electrical current to flow between second port means 43 and second rechargeable battery 40, such that second rechargeable battery 40 is electrically charging. Although second port means 43 is shown, in FIG. 3, as being located under the cradle in base unit 11, the inventors also contemplate that second port means 30 could be external to but operably associated with base unit 11 via an electrical connection. As was also the case with first port means 30, the inventors contemplate other constructions for second port means 43 including the use of a plug and socket assembly rather than electrical contacts.

FIG. 4 of the drawings is a block schematic diagram of the present invention 100, which would be contained within base unit 11. Base unit 11 is operably connected to a wall socket (not shown) through electrical cord 15 and is thus provided with an AC voltage. In a preferred embodiment of apparatus 100, this AC voltage is fed into DC power supply means 101, which converts the alternating current voltage from the wall socket to a 12 volt direct current voltage. DC power supply means 101 may be placed outside base unit 11, in a separate housing such as an AC adapter. DC power supply means 101 comprises a transformer operably connected to a full-wave rectifier and may further include a reservoir capacitor operably connected to the output of DC power supply means 101.

First current source means 110 is operably associated with external power supply 15 through DC power supply means 101 and first port means 30 for providing an electrical current to first rechargeable battery 20 upon operable acceptance of first rechargeable battery 20 by first port means 30. As the electrical current need not be constant for this application, the first current source means 110 may comprise a resistive load, a transistor network or a constant current source. In a preferred embodiment, the electrical current provided by first current source means 110 is approximately 60 mA, which is used to charge first rechargeable battery 20 when it is operably accepted by first port means 30.

In a preferred embodiment, first port means 30 includes two electrical contacts 30a and 30c, which are relevant to apparatus 100. Electrical contact 30a is operably connected to first current source means 110 and electrical contact 30c is operably connected to ground, such that the charging path including first rechargeable battery 20 may be completed.

Second current source means 120 is operably associated with external power supply 15 through DC power supply means 101 and second port means 43 for providing an electrical current to second rechargeable battery 40 upon operable acceptance of second rechargeable battery 40 by second port means 43. Because the electrical current need not be constant for this application, second current source means 120 may comprise a resistive load, a transistor network or a constant current source. In a preferred embodiment, the electrical current provided by second current source means 120 is approximately 60 mA, which is normally used to charge second rechargeable battery 40 when it is operably accepted by second port means 43.

As shown in FIG. 4, backup power supply switch means 125 may be positioned electrically in parallel to second current source means 120. However, as shown in FIG. 5, a second embodiment (which is a preferred embodiment in a cordless phone) has backup power supply switch means 125 as part of voltage regulator regulation means 103. The main purpose of backup power supply switch means 125 is to provide voltage from second rechargeable battery 40 (when it is operably accepted by said second port means 43 and electrically charged) to voltage regulation means 103 upon failure of external power supply 15, or even failure of DC power supply means 101. The desirability of the second embodiment lies in the minimization of voltage loss between second rechargeable battery 40 operably and detachably accepted in second port means 43. Pass devices 104 and 105, as shown in FIG. 5, are part of voltage regulator means 103 but they further control the source of electrical power to voltage regulator means 103. The source for pass device 104 is the unregulated external power supply, while the source for pass device 105 is second rechargeable battery 40 through second port means 43. In normal operation, pass device 104 is biased by Vunreg and the various electrical components such that pass device 104 provides the regulated output voltage. However, if the main power fails, Vunreg becomes zero and no power is available for pass device 104. As Vunreg changes the circuit is rebiased such that pass device 105 conducts, thus providing Vunreg from second rechargeable battery 40 which is operably and detachably accepted by second port means 43. As can be seen, the battery voltage merely has to overcome the saturation voltage of the pass device.

FIG. 5 illustrates one potential embodiment of voltage regulator 103. In addition to pass devices 104 and 105, as discussed above, voltage regulator also includes DC amplifier 130, which provides large close loop gain and various biasing resistors for controlling the operating point of the presently regulated voltage. Thus, voltage regulator provides Vreg, at a number of terminals, each being a potential source of this desired voltage for supply to the base unit circuitry.

In the present embodiment, first and second rechargeable batteries 20 and 40 are nickel cadmium batteries capable of holding a maximum of 6 volts. In one embodiment, because fully discharged nickel cadmium batteries poorly accept small charging voltages, backup power supply switch means 125 may comprise a zener diode parallel to second current source rather than a simple diode (which would also provide the power outage switching desired in apparatus 100). For instance, in a preferred embodiment shown in FIG. 5 simple diode 106 would be replaced by a zener diode so as to provide quick recharge means for second rechargeable battery 40 operably and detachably accepted by second port means 43. By choosing the zener voltage in the present embodiment to be between 6 volts and 9 volts, backup power supply switch means 125 can be reverse biased in the diode breakdown region, such that backup power supply switch means 125 acts as a quick recharge means providing a large electrical current to second port means 43 upon operable acceptance of second rechargeable battery 40 when the battery is substantially discharged. This large electrical current, which flows through backup power supply switch means 125 toward second rechargeable battery 40, continues until the battery's voltage reaches a predetermined voltage—which is a function of the selected zener voltage and the voltage output by DC power supply means 101. Once this point is reached, charging continues solely through second current source means 120 (as shown in FIG. 4).

In a preferred embodiment, second port means 43 includes two electrical contacts 43a and 43b. Electrical contact 43a is operably connected to second current source means 120 and electrical contact 43b is operably connected to ground, such that the charging path including second rechargeable battery 40 may be completed.

The preferred embodiment of apparatus 100 further includes reverse current prevention means 102, which comprises a silicon diode. Reverse current prevention means 102 is oriented such that current can not flow from node B to node A. Thus, when external power source 15 or DC power supply means 101 fails and second rechargeable battery 40 provides voltage to voltage regulator means 103 through backup power supply switch means 125, this voltage can not result in a current in first current source means 110.

In the depicted embodiment of the invention, cordless telephone base unit 11 is a digital apparatus utilizing TTL logic levels, such that voltage regulator means 103 is responsible for providing a regulated and stepped-down voltage of 5 volts to the base unit circuitry including base unit transmitter 140 and base unit receiver 145.

The foregoing description and drawings merely explain and illustrate the invention and the invention is not limited thereto, except insofar as the appended claims are so limited and as those skilled in the art who have the disclosure before them will be able to make modifications and variations therein without departing from the scope of the invention.

We claim:

1. An alternative power supply apparatus for use in association with systems having a base unit connected to an external power supply and an associated battery-powered portable unit, said alternative power supply apparatus comprising:

two rechargeable batteries wherein a first one of said two rechargeable batteries is operably associated with the battery-powered portable unit and serves to provide electrical power to the battery-powered portable unit, said first one and second one of said two rechargeable batteries being operably interchangeable;

first port means operably associated with the base unit for operably and detachably receiving said first one of said two rechargeable batteries so as to allow electrical current to flow between said first port means and said first one of said two rechargeable batteries;

second port means operably associated with the base unit for operably and detachably receiving a second one of said two rechargeable batteries so as to allow electrical current to flow between said second port means and said second one of said two rechargeable batteries;

first current source means operably associated with the external power supply and said first port means for providing an electrical current to said first one of said two rechargeable batteries upon said operable reception of said first one of said two rechargeable batteries by said first port means;

second current source means operably associated with the external power supply and said second port means for providing an electrical current to said second one of said two rechargeable batteries upon said operable reception of said second one of said two rechargeable batteries by said second port means; and backup power supply switch means operably connected between said second port means and circuitry in the base unit for providing voltage from said second one of said two rechargeable batteries operably received by said second port means upon failure of the external power supply to provide voltage to at least a radio transmitter and receiver both of which communicate with said associated battery-powered portable unit, said radio transmitter and receiver being included as part of said circuitry.

2. The invention according to claim 1 wherein said alternative power supply apparatus further includes:

voltage regulation means operably associated with the external power supply and said second port means for providing a regulated voltage said to circuitry in the base unit.

3. The invention according to claim 1 wherein said alternative power supply apparatus further includes:

reverse current prevention means operably connected between said first current source means and said backup power supply switch means for substantially preventing current generated by said second one of said two rechargeable batteries operably accepted by said second port means from charging said first one of said two rechargeable batteries operably accepted by said first port means.

4. The invention according to claim 3 wherein said reverse current prevention means comprises a diode.

5. The invention according to claim 1 wherein said backup power supply switch means further includes quick recharge means for providing a large electrical current to said second port means upon said operable reception of said second one of said two rechargeable batteries by said second port means, said second one of said two rechargeable batteries being substantially discharged, said large electrical current serving to quickly recharge said second one of said two rechargeable batteries until the voltage of said second one of said two rechargeable batteries reaches a predetermined voltage.

6. The invention according to claim 5 wherein said backup power supply switch means comprises a zener diode.

7. The invention according to claim 3 wherein said backup power supply switch means further includes quick recharge means for providing a large electrical current to said second port means upon said operable reception of said second one of said two rechargeable batteries by said second port means, said second one of said two rechargeable batteries being substantially discharged, said large electrical current serving to quickly recharge said second one of said two rechargeable batteries until the voltage of said second one of said two rechargeable batteries reaches a predetermined voltage.

8. The invention according to claim 1 wherein said first current source means comprises a resistor.

9. The invention according to claim 8 wherein said second current source means comprises a resistor.

10. The invention according to claim 1 wherein said first current source means comprises a constant current source oriented such that the produced current flows into said first port means upon and during said operable reception of said first one of said two rechargeable batteries by said first port means.

11. The invention according to claim 10 wherein said second current source means comprises a resistor.

12. The invention according to claim 8 wherein said second current source means comprises a constant current source oriented such that the produced current flows into said second port means upon and during said operable reception of said second one of said two rechargeable batteries by said second port means.

13. The invention according to claim 10 wherein said second current source means comprises a constant current source oriented such that the produced current flows into said second port means upon and during said operable reception of said second one of said two rechargeable batteries by said second port means.

14. The invention according to claim 1 wherein said reverse current prevention means comprises a diode having its anode operably connected to said first current source means and its cathode electrically connected to said backup power supply switch means.

15. The invention according to claim 1 wherein said backup power supply switch means comprises a diode having its anode operably connected to said second port means.

16. The invention according to claim 1 wherein the external power supply is an alternating current power supply said alternative power supply apparatus further includes:

DC power supply means connected to the external power supply for converting alternating current voltage to a direct current voltage.

17. An alternative power supply apparatus for use in association with systems having a base unit connected to an external power supply and an associated battery-powered portable unit, said alternative power supply apparatus comprising:

two rechargeable batteries wherein a first one of said two rechargeable batteries is operably associated with the battery-powered portable unit and serves to provide electrical power to the battery-powered portable unit, said first one and second one of said two rechargeable batteries being operably interchangeable;

first port means operably associated with the base unit for operably and detachably receiving said first one of said two rechargeable batteries so as to allow electrical current to flow between said first port means and said first one of said two rechargeable batteries;

second port means operably associated with the base unit for operably and detachably receiving a second one of said two rechargeable batteries so as to allow electrical current to flow between said second port means and said second one of said two rechargeable batteries;

a charging path operably associated with said external power supply, said first port means and said second port means; and backup power supply switch means operably connected between said second port means and circuitry in the base unit for providing voltage from said second one of said two rechargeable batteries operably received by said second port means upon failure of the external power supply to provide voltage to at least a radio transmitter and receiver both of which communicate with said associated battery,powered portable unit, said radio transmitter and receiver being included as part of said circuitry.

18. The invention according to claim 17 wherein said alternative power supply apparatus further includes:

reverse current prevention means operably connected in said charging path between said first port means and said backup power supply switch means for substantially preventing current generated by said second one of said two rechargeable batteries operably receiving by said second port means from charging said first one of said two rechargeable batteries operably receiving by said first port means.

19. The invention according to claim 18 wherein said reverse current prevention means comprises a diode.

20. The invention according to claim 17 wherein said backup power supply switch means further includes quick recharge means for providing a large electrical current to said second port means upon said operable acceptance of said second one of said two rechargeable batteries by said second port means, said second one of said two rechargeable batteries being substantially discharged, said large electrical current serving to quickly recharge said second one of said two rechargeable batteries until the voltage of said second one of said two rechargeable batteries reaches a predetermined voltage.

\* \* \* \* \*

UNITED STATES PATENT AND TRADEMARK OFFICE
CERTIFICATE OF CORRECTION

PATENT NO. : 5,578,875
DATED : November 26, 1996
INVENTOR(S) : Michael W. Dormer
  Michael B. Ashdown It is certified that error appears in the above-indentified patent and that said Letters Patent is hereby corrected as shown below:

Col. 7, Line 54    after --"voltage" delete "said" and before "circuitry", insert said--

Col. 9, Line 28    After battery delete --,-- and insert instead --"-"--.

Signed and Sealed this

Fifteenth Day of July, 1997

Attest:

BRUCE LEHMAN

Attesting Officer    Commissioner of Patents and Trademarks